United States Patent [19]

Tushinsky et al.

[11] Patent Number: 4,458,813
[45] Date of Patent: Jul. 10, 1984

[54] HOUSING FOR A VIDEO CASSETTE PLAYBACK MACHINE

[75] Inventors: Joseph S. Tushinsky, Encino; James S. Murchison, Canoga Park; John R. Ballantyne, Pacific Palisades, all of Calif.

[73] Assignee: Superscope, Inc., Chatsworth, Calif.

[21] Appl. No.: 341,481

[22] Filed: Jan. 21, 1982

[51] Int. Cl.³ ............................................. B65D 85/30
[52] U.S. Cl. ............................. 206/320; 179/189 D; 200/304; 206/305; 206/328; 206/521; 400/677
[58] Field of Search ............... 206/1.5, 305, 521, 523, 206/328, 333, 320; 220/339; 361/179, 199; 200/42 T, 304, 333, 334, 441; 179/189 D; 400/677

[56] References Cited

U.S. PATENT DOCUMENTS

| | | | |
|---|---|---|---|
| 2,410,519 | 11/1946 | Opalek | 200/44 |
| 3,339,781 | 9/1967 | Schurman et al. | 206/349 |
| 3,866,000 | 2/1975 | Gillis | 179/189 D |
| 4,005,279 | 1/1977 | Richter | 179/189 D |
| 4,295,179 | 10/1981 | Read | 206/523 |
| 4,297,539 | 10/1981 | Fairbanks | 179/189 D |
| 4,420,078 | 12/1983 | Belt et al. | 206/305 |

FOREIGN PATENT DOCUMENTS

| | | | |
|---|---|---|---|
| 2919599 | 11/1980 | Fed. Rep. of Germany | 179/189 D |
| 3013944 | 10/1981 | Fed. Rep. of Germany | 179/189 D |
| 0359193 | 2/1962 | Switzerland | 200/44 |
| 0465739 | 1/1937 | United Kingdom | 206/305 |

Primary Examiner—George E. Lowrance
Assistant Examiner—Jimmy G. Foster
Attorney, Agent, or Firm—Fulwider, Patton, Rieber, Lee & Utecht

[57] ABSTRACT

A housing is provided for encasing a video cassette playback machine with selected portions of the machine being accessible through relatively small access openings in the housing to permit restricted operation of the machine. The housing comprises an impact resistant portable carrying case which can be opened for reception of the machine loaded with a selected video cassette and then closed and locked. The carrying case supports a face plate in a position covering the machine control panel wherein one or more access openings are formed in the face plate to permit access to selected machine control devices, such as, for example, the "play" switch, while masking and thus preventing access to other machine control devices, such as, for example, the "record" switch. In one embodiment, a hinged panel is mounted on the inboard side of the face plate and is selectively positioned to open or close access openings in the face plate.

22 Claims, 9 Drawing Figures

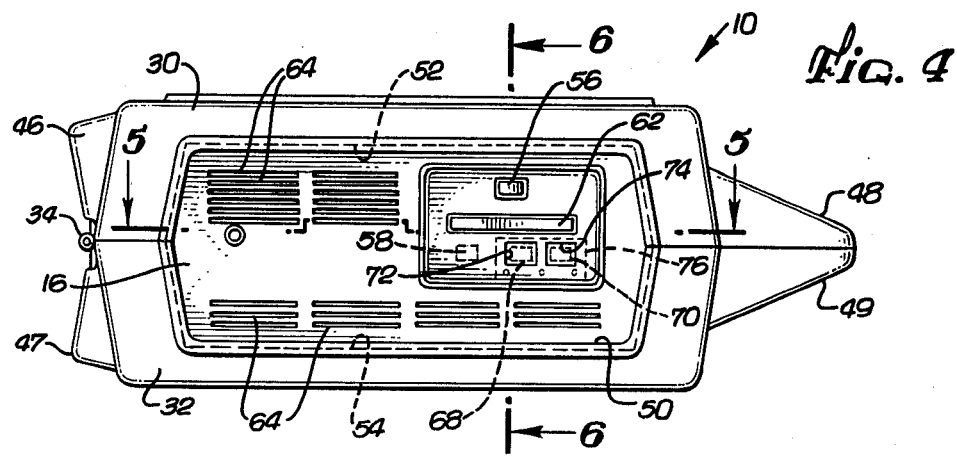
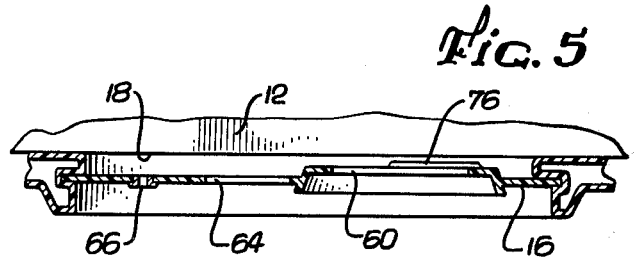
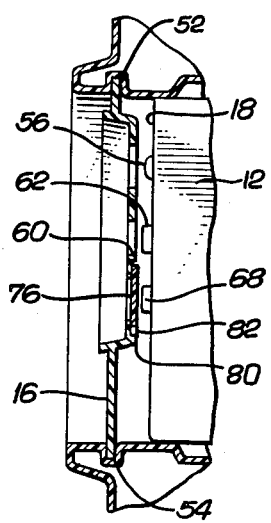
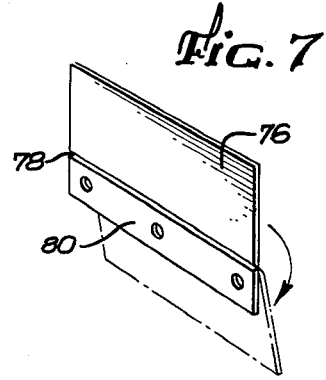
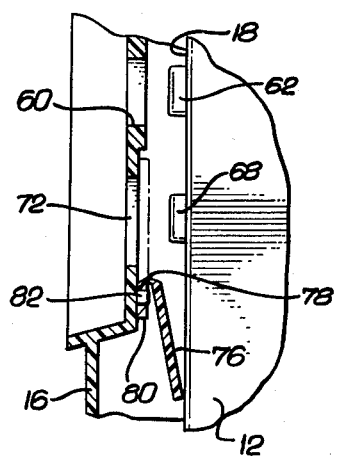
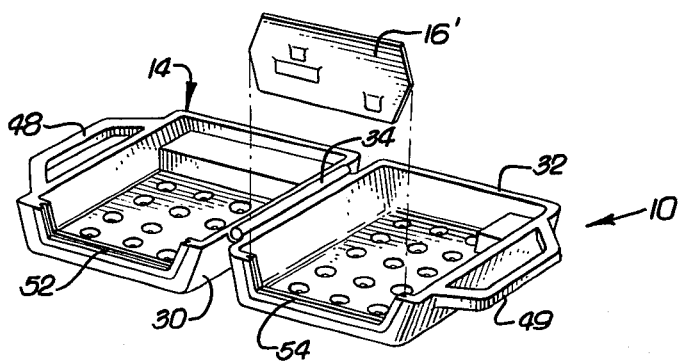

HOUSING FOR A VIDEO CASSETTE PLAYBACK MACHINE

BACKGROUND OF THE INVENTION

This invention relates generally to devices for encasing and protecting a video cassette playback machine while permitting operation of the machine on a restricted basis.

Video cassette playback machines in general are known in the art. Such machines typically comprise a machine housing having a cassette-receiving chamber into which a standardized video cassette can be loaded into association with a machine record-playback head. Magnetic video tape within the cassette is advanced past the record-playback head during operation of the machine in response to selective actuation of a variety of control devices, such as a "play" switch, a "record" switch, a "rewind" switch, a "fast forward" switch, a "stop" switch, and the like, wherein these control devices are all typically mounted on a control panel at one side of the machine housing. If desired, this control panel may include a variety of additional control devices for monitoring operation of the machine, such as, for example, a numerical counter, a dew indicator, and the like.

The video cassette playback machine is operated in conjunction with a conventional television set either to record broadcast television programs for later viewing or to playback selected video programs which have been prerecorded upon video cassettes. In this regard, many desirable video programs such as full-length motion pictures in an uncut, uninterrupted format are not broadcast for normal television viewing, whereby a substantial market has arisen for the sale and/or rental of video cassettes having selected video programs recorded thereon. Thus, by purchasing and/or renting selected video cassettes, the playback machine owner has access to an extremely broad range of video programming which would not otherwise be available for viewing.

While modern video cassette playback machines have become increasingly popular, the cost of purchasing a machine has been a significant obstacle for many consumers. Accordingly, the current market for machines has remained relatively small particularly when compared with the market scope for television sets. This limited machine market correspondingly limits the demand for prerecorded video cassettes either on a purchase or rental basis.

One way of increasing the market scope for machines and video cassettes is to make both the machines and the cassettes available to the consumer on a rental basis for a relatively small fee. Such a rental system would permit many consumers to enjoy the benefits of video cassette playback machines on a periodic basis as desired and at a nominal cost compared with the machine purchase price. However, rental schemes include major drawbacks such as providing an effective way to safeguard the machine and the cassettes against damage and misuse.

Accordingly there exists a significant need for a practical and economical device for protecting a video cassette playback machine and a selected video cassette against damage and misuse during a rental period. The present invention fulfills this need.

SUMMARY OF THE INVENTION

In accordance with the invention, a protective housing is provided for encasing a video cassette playback machine having a selected video cassette loaded therein and ready for playing a video program recorded thereon. The housing is adapted to be closed and locked to prevent removal or unauthorized tampering with the playback machine or the video cassette. When closed and locked, a limited portion of the machine control panel is accessible from the exterior of the housing thereby to permit operation of selected machine control devices while preventing operation of other machine control devices.

In a preferred embodiment of the invention, the protective housing comprises an impact resistant portable carrying case, such as a double walled case formed from a relatively lightweight plastic material or the like. The carrying case is configured in hinged halves movable between an open position for reception thereinto of the machine preloaded with a selected video cassette and a closed position substantially encasing the machine. A lock is provided to prevent unauthorized opening of the casing and thereby correspondingly prevent unauthorized access to the machine or the video cassette.

One side of the carrying case supports a face plate positioned to cover the control panel of the playback machine. This face plate includes a selected number of access openings at predetermined locations to permit access or viewing therethrough of selected machine control devices. For example, when it is desired to restrict operation of the machine to a single play of the program recorded on the video cassette, access openings in the face plate may be provided to permit conventional actuation of the "play" and "stop" switches on the machine control panel. Other machine control devices, such as the "rewind", "fast forward", and "record" switches are selectively masked by the face plate to prevent actuation thereof by the consumer.

The face plate is, in its preferred form, removable from the carrying case when the case is in the open position, but is locked against removal when the case is closed and locked. Accordingly, interchangeable face plates may be provided having different sets of access openings formed therein, wherein the particular face plate utilized for a given consumer can be chosen according to the rental fee paid. Alternately, the face plate may be provided with one or more movable panels for controllably closing or opening selected access openings to modify the permitted degree of machine operation. For example, access openings may be formed in the face plate to expose the "rewind" and "fast forward" switches to permit repeated viewing of the recorded program by the consumer. However, when repeated viewing is not desired, these access openings can be blocked to render these control switches inaccessible.

The protective housing further includes at least one interior compartment for storage of appropriate power and signal cords required for proper operation of the machine. This storage compartment is readily accessible to the consumer, such as via a removable door, to permit appropriate connection of the power cord to a suitable power supply and connection of the signal cord to the consumer's television set.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a side elevation view of the housing illustrating a face plate covering the control panel of the video cassette playback machine;

FIG. 5 is an enlarged fragmented horizontal section through a portion of the housing taken generally on the line 5—5 of FIG. 4;

FIG. 6 is an enlarged fragmented vertical section through a portion of the housing taken generally on the line 6—6 of FIG. 4 and illustrating a movable panel in a position masking a portion of the machine control panel;

FIG. 7 is an enlarged perspective view of the movable panel for use in selectively masking portions of the machine control panel;

FIG. 8 is an enlarged fragmented vertical section through a portion of the housing generally similar to FIG. 6 but illustrating the movable panel in an alternative position exposing an additional portion of the machine control panel; and FIG. 9 is a perspective view illustrating the housing in an open position and depicting in exploded form an alternative face plate for use in covering the control panel of a video cassette playback machine.

DETAILED DESCRIPTION OF THE PREFERRED EMBODIMENTS

Figure 1:
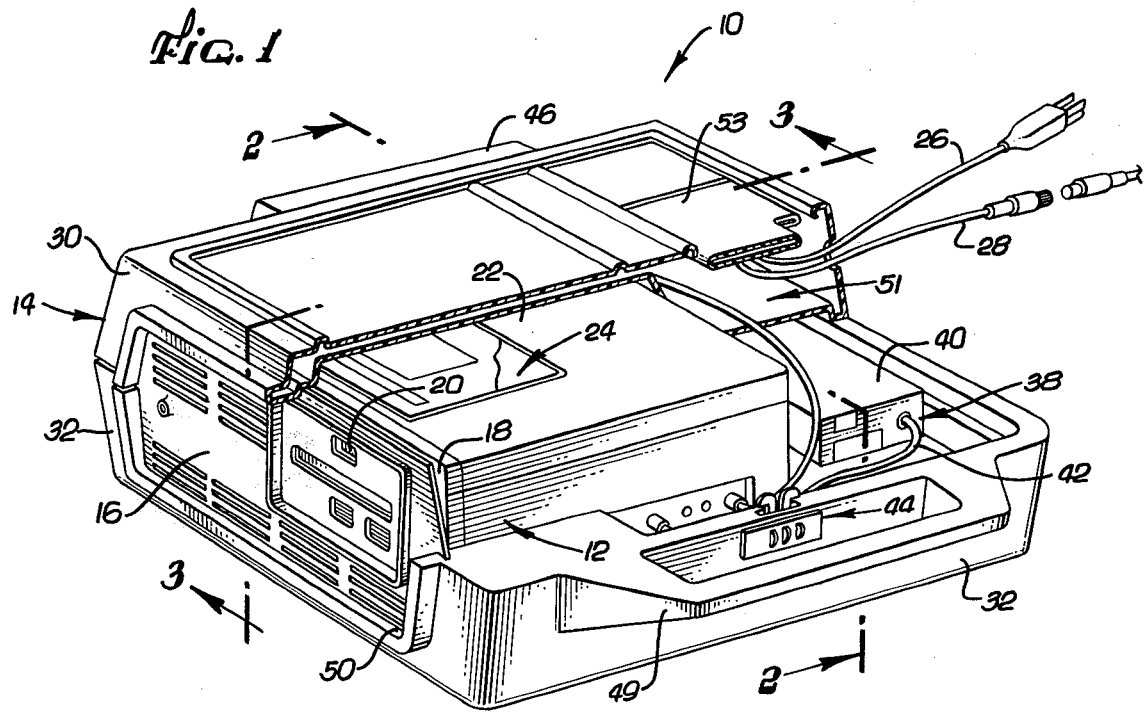
FIG. 1 is a perspective view of the protective housing of this invention with portions broken away to illustrate a video cassette playback machine encased therein.

As shown in the exemplary drawings, a protective housing designated generally by the reference numeral 10 is provided for encasing and protecting a video cassette playback machine 12. The protective housing 10 is provided in the form of an impact resistant portable carrying case 14 sized and shaped for relatively snug reception of the playback machine 12. The carrying case 14 supports a face plate 16 in a position covering a control panel 18 of the machine 12 wherein the face plate 16 masks some of the control devices on the machine control panel while permitting access to and operating of other control devices through at least one selectively positioned access opening 20.

The video cassette playback machine 12 is of conventional design and construction to include appropriate electronic and mechanical components mounted within a machine housing 22 for use in playing back video programs recorded upon magnetic video recording tape carried by a conventional video cassette (not shown). More particularly, the machine housing 22 conventionally includes a cassette-receiving chamber 24 for removable reception of a selected video cassette into close association with a machine record-playback head (also not shown). The record-playback head, in response to electrical power supplied to the machine via a power cord 26, provides electronic signals indicative of video information on the recording tape wherein these signals are processed for supply via a signal cord 28 to a conventional television set (not shown) for display of the recorded video program, all in a well-known manner. Importantly, one side of the machine housing 22 constitutes the control panel 18 upon which are located a number of control devices for use in controlling the operation of the playback machine 12. For example, video cassette playback machines normally include an "on-off" switch for controlling supply of power to the machine, a "play" switch for advancing recording tape past the record-playback head, a "stop" switch for stopping tape advancement, a "rewind" switch for rapid rewinding of the tape, a "fast forward" switch for rapid advancing of the tape, and a "record" switch for placing the machine in a recording mode. In addition, a variety of other control devices may be provided for use in monitoring machine operation, such as a numerical counter, a dew indicator, and the like.

The protective housing 10 of this invention is designed for encasing and protecting the video cassette playback machine 12 for insuring safe portability while selectively limiting access to the machine control devices. In this regard, the protective housing 10 of this invention is particularly well adapted for use in the rental of video cassette playback machines in that the protective housing permits restricted consumer operation of the machine while at the same time protecting both the machine and the video cassette inserted into the cassette chamber 24 against damage from abusive handling or misuse, thereby insuring safe transport, use, and return of the machine and video cassette.

Figure 2:
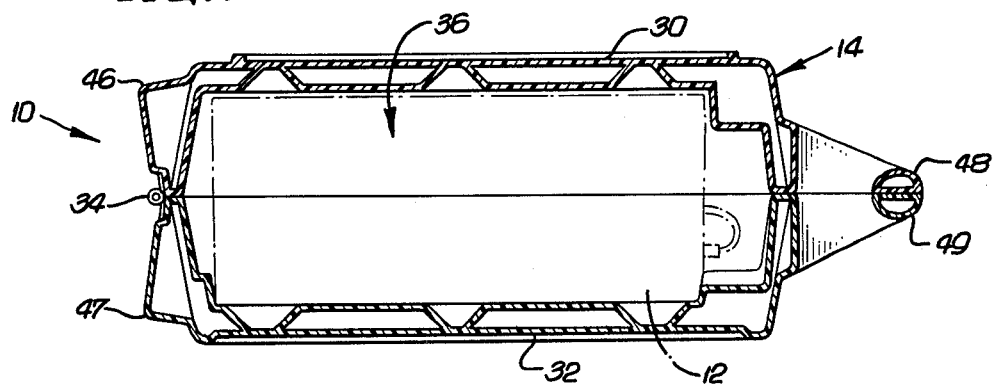
FIG. 2 is a vertical section of the housing taken generally on the line 2—2 of FIG. 1.
Figure 3:
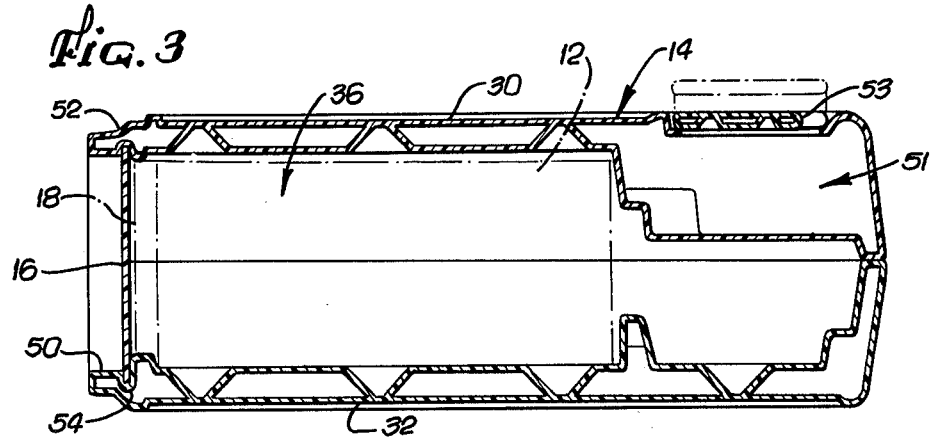
FIG. 3 is a vertical section of the housing taken generally on the line 3—3 of FIG. 1.

In the preferred form, the protective housing 10 comprises a pair of complementary-shaped housing halves 30 and 32 hinged together along a common margin by a hinge 34 to define the portable carrying case 14. These housing halves 30 and 32 are formed advantageously from a relatively lightweight and inexpensive material, such as polyethylene plastic molded to have a double wall construction for strength and impact resistance. Importantly, the two housing halves 30 and 32 cooperate with each other to define a machine-receiving compartment 36 configured for relatively snug reception of the video cassette playback machine 12, as viewed in FIGS. 1-3, to support the machine in a substantially fixed position relative to the carrying case 14 regardless of the case orientation. Conveniently, in order to permit the carrying case 14 to have a minimum size for optimum portability, the playback machine preferably comprises a relatively compact and lightweight machine, such as a commercially available portable machine of the type powered by a direct current battery power supply. In this regard, the two housing halves 30 and 32 further cooperate to define an auxiliary compartment 38 for relatively snug reception of a power converter unit 40 adapted for converting an alternating current power supply obtained via the power cord 26 to an appropriate direct current power supply for connection to the machine via an appropriate conductor 42.

In use, the two housing halves 30 and 32 are movable about the hinge 34 between an open position permitting access to the interior of the carrying case 14 and a closed position precluding access to the case interior. In the open position, the video cassette playback machine 12 and the associated power converter unit are quickly and easily placed within one of the housing halves, such as the lower housing half 32, as viewed in FIGS. 1-4. Importantly, in this position, the cassette-receiving chamber 24 in the machine housing 22 is accessible to permit loading with a selected video cassette having a desired video program prerecorded thereon. After the cassette is loaded, the housing halves 30 and 32 can be closed upon one another to encase and protect the machine 12 within the interior compartment 36. A locking assembly 44 (FIG. 1) of conventional design is provided for selectively locking the housing halves in the closed position. Importantly, while the particular form of the locking assembly may vary, it is desirable for the locking assembly to prevent the renting consumer from easily opening the carrying case 14 whereby the machine 12 and the selected video cassette are not directly accessible to the consumer.

The carrying case 14 is desirably equipped with additional features which facilitate transport, use, and handling of the machine in a consumer rental environment. More specifically, the housing halves 30 and 32 advantageously include cooperating support feet 46 and 47 adjacent the hinge 34 to permit the case to stand in an upright position. The housing halves further include cooperating handle members 48 and 49 located opposite the support feet wherein these handle members combine when the case 14 is closed to form a single handle for easy grasping and easy carrying about of the case. These handle members 48 and 49 are positioned generally to overlie the locking assembly 44 such that the locking assembly is not readily accessible to prying tools or other devices intended for use in gaining unauthorized entry into the case. In addition, the upper housing half 30 conveniently includes a relatively small storage chamber 51 formed between the double walls thereof for storage of the machine power cord 26 and signal cord 28, wherein this storage chamber is selectively closed by use of a snap-fit door 53 or the like.

At one side of the carrying case 14, the two housing halves 30 and 32 cooperate to define an enlarged opening 50 to permit access to the control devices on the machine control panel 18, and thereby permit the consumer to operate the playback machine 12. However, this opening 50 is substantially closed by the face plate 16 whereby the substantial majority of the machine control panel 18 is masked and thus not accessible to the consumer. Access to the control panel 18 is restricted to the relatively small access opening 20 in the face plate wherein this access opening 20 is positioned at a predetermined location in alignment with a selected control device on the control panel 18.

More particularly, as shown in detail in FIGS. 4-6, the enlarged opening 50 in the carrying case 14 is bounded by facing aligned recesses 52 and 54 formed respectively in the two housing halves 30 and 32 for reception of the face plate 16. That is, when the housing halves 30 and 32 are in the open position, the face plate 16 is quickly and easily fitted into the recess 54 in the lower housing half 32. When the housing halves are moved to the closed position, the upper housing half 30 is closed over the face plate to fit the face plate into its associated recess 52 and to correspondingly trap the face plate in a position covering the control panel 18 of the encased playback machine 12. Accordingly, the face plate is locked in position by the housing halves until the carrying case 14 is again returned to the open position.

The small access opening 20 in the face plate 16 is selectively positioned in alignment with at least one control device on the machine control panel 18 to permit operation of that device by the renting consumer. For example, since the consumer is desirous of viewing the video program recorded on the video cassette loaded previously into the machine, the access opening 20 is formed in alignment with the "play" switch 56 on the machine control panel to enable the consumer to actuate the "play" switch and thereby view the recorded program. However, since it is not desirable to permit the consumer to erase the program recorded on the video cassette, the face plate 16 masks other control devices, such as the "record" switch 58 to thus prevent consumer access to this switch.

In some instances, additional access openings in the face plate 16 to permit additional access to the machine control panel 18 are desirable. For example, a second access opening 60 may be provided to permit consumer access to the "stop" switch 62, and thereby allow the consumer to start and stop the video program as desired. Moreover, further openings in the face plate are desirably provided, such as ventilation slots 64 to prevent overheating of the machine and/or viewing openings 66 to permit monitoring of selected control devices, such as a dew indicator lamp, numerical counter, or the like (not shown).

With respect to some control devices on the machine control panel 18, it is desirable to provide the option either of permitting or preventing consumer access. For example, it may be desirable to limit the consumer to a single viewing of the recorded video program, whereby it is necessary to prevent access to the conventional "rewind" switch 68 and "fast forward" switch 70. Alternatively, with other consumers, access to the "rewind" and "fast forward" switches may be desired to permit viewing of the recorded video program more than one time.

According to one form of the invention, the face plate 16 accommodates optional access to selected control devices by including additional access openings 72 and 74 in alignment, for example, with the "rewind" and "fast forward" switches 68 and 70. The additional access openings 72 and 74 are associated with a closure panel 76 hinged as by a score line 78 to a mounting base 80 secured in a suitable manner upon mounting pins 82 at the inboard side of the face plate. This closure panel 76 is thus selectively movable between a closed position, as viewed in FIGS. 6 and 7, closing the access openings 72 and 74 to prevent access to the "rewind" and "fast forward" switches and an open position, as viewed in FIG. 8, permitting access to these switches. Conveniently, the closure panel 76 is easily moved between the open and closed positions prior to insertion of the face plate 16 into the recesses when the carrying case is in the open position. However, when the carrying case is closed, the close spacing between the face plate and the machine control panel precludes movement of the closure panel 76 between open and closed positions.

According to an alternative form of the invention, as illustrated in FIG. 9, optional access to various machine control devices can be obtained by use of one or more interchangeable face plates 16' having access openings formed therein in an array different from that shown in FIGS. 1-8. Thus, by inserting the desired one of several interchangeable face plates at the time the machine and video cassette are rented, it is possible to select the degree of consumer access to the machine without requiring movable closure panels, as depicted in FIGS. 4-8.

The machine 12 of this invention thus provides a lightweight, inexpensive, and practical apparatus for protecting and encasing a video cassette playback machine wherein the machine and contained video cassette are securely locked therein and protected against damage and misuse. Moreover, the permitted number and identity of control devices accessible to the consumer are easily controlled in accordance with the requirements of the particular consumer.

A variety of modifications and improvements to the invention described herein are believed to be apparent to one skilled in the art. Accordingly, no limitation on the invention is intended, except by way of the appended claims.

What is claimed is:

1. A protective housing for a video cassette playback machine, said machine having a plurality of control devices for use in controlling machine operation and a cassette-receiving chamber for reception of a cassette having information recorded thereon, said housing comprising:

a carrying case having a compartment formed therein for reception of the machine in a position oriented with the control devices at a predetermined side of the compartment, said case further including means forming an enlarged opening therein at said predetermined side of the compartment to permit access to the machine control devices from the exterior of said case and means for denying access to the cassette-receiving chamber of the machine when the machine is received into the compartment; and a face plate supported by said case in a position substantially covering said enlarged opening at said predetermined side of the compartment for substantially covering the machine control devices when the machine is positioned within the compartment for masking and thereby substantially preventing access from the exterior of said case to at least one of the machine control devices, said face plate having a plurality of access openings formed therein and further including closure means associated with at least one selected access opening and movable between a first position permitting access through said selected opening to one of the machine control devices and a second position preventing access through said selected opening to permit variably controlled access to and operation of the machine control devices from the exterior of said case.

2. The protective housing of claim 1 wherein said carrying case comprises at least two case members movable between an open position to permit reception of the machine into the compartment and a closed position substantially encasing the machine, one of said case members overlying the cassette-receiving chamber to deny access thereto.

3. The protective housing of claim 2 wherein said case members are formed from an impact resistant material.

4. The protective housing of claim 2 wherein said two case members comprise a pair of complementary-shaped housing halves and a hinge means coupling said housing halves with respect to each other along a common margin to permit movement of said housing halves between the open and closed positions.

5. The protective housing of claim 2 including means for selectively locking said case members in the closed position.

6. The protective housing of claim 1 wherein said case includes support feet at one side thereof to permit the case to stand upright, and a handle member at a side generally opposite said support feet to facilitate carrying of said case.

7. The protective housing of claim 1 wherein said carrying case is formed from a relatively lightweight plastic material having an impact resistant, double-walled construction.

8. The protective housing of claim 1 wherein said carrying case includes means for retaining said face plate in a position closely overlying and substantially covering the plurality of machine control devices.

9. The protective housing of claim 1 wherein said carrying case includes means for retaining said face plate and the machine in a position with said face plate closely overlying and substantially covering the plurality of machine control devices when the machine is received into the compartment, and wherein said closure means comprises a panel member hingedly connected along one edge thereof to the side of said face plate adjacent the machine for swinging movement between the first and second positions, said panel member having a hinge radius size measured between said one edge and an opposite edge thereof substantially greater than the distance between said face plate and the machine control devices to prevent movement between the first and second positions when said face plate is in the position substantially covering the machine control devices.

10. The protective housing of claim 1 wherein the machine includes a power cord, said housing having a storage compartment accessible from the exterior of the housing for storage of said cord.

11. A protective housing for a video cassette playback machine, said machine having a plurality of control devices for use in controlling machine operation and a cassette-receiving chamber for reception of a cassette having information recorded thereon, said housing comprising:

a carrying case including at least two case members coupled to each other for movement between an open position and a closed position, said case members defining a compartment for reception of the machine in a position oriented with the control devices at a predetermined side of the compartment and being shaped to substantially encase the machine within the compartment and to deny access to the cassette-receiving chamber when said members are in the closed position, said case further having an enlarged opening formed therein at said predetermined side of the compartment when said case members are in the closed position to permit access to the machine control devices from the exterior of said case when the machine is received into the compartment;

means for selectively locking said case members in the closed position;

a plurality of face plates each having at least one access opening formed therein at a predetermined location different from the position of the at least one access opening of the remaining ones of said face plates; and means for removably and interchangeably mounting a selected one of said face plates in a position substantially covering said enlarged opening at said predetermined side of the compartment for substantially covering and closely overlying the machine control devices when the machine is encased within the compartment, said selected face plate permitting access to and operation of at least one of the machine control devices from the exterior of said case through the at least one access opening formed in said selected face plate, said selected face plate masking at least one other of the machine control devices to prevent access thereto from the exterior of said case, whereby access to the machine control devices is variably controlled in accordance with selection of the one of said face plates supported by said case.

12. The protective housing of claim 11 wherein said case includes support feet at one side thereof to permit the case to be stored upright, and a handle member at a side generally opposite said support feet to facilitate carrying of said case.

13. The protective housing of claim 11 wherein said carrying case is formed from a relatively lightweight plastic material having an impact resistant, double-walled construction.

14. The protective housing of claim 11 wherein at least some of said face plates have a plurality of access openings formed therein to permit access therethrough to a limited plurality of the machine control devices.

15. The protective housing of claim 11 wherein said case members cooperate to define the enlarged opening at one side of said case wherein said enlarged opening is bounded at least partially by a pair of facing receses formed by said case members, said selected face plate being removably receivable into the recesses when said case members are in the open position and retained within the recesses when said case members are in the closed position.

16. A combination video cassette playback machine and protective housing therefor, comprising:
a video cassette playback machine having a cassette-receiving chamber formed therein for reception of a cassette having information recorded thereon, said machine further including a plurality of control devices at one side thereof for use in controlling machine operation;
case means for mounting on the machine to deny access to the cassette-receiving chamber, said case means having an enlarged opening formed therein in a position for permitting access to said machine control devices from the exterior of said case means when said case means is mounted on the machine; and
face plate means for mounting on said case means in a position substantially covering said enlarged opening for substantially covering the machine control devices for masking and thereby preventing access from the exterior of said case means to at least one of the machine control devices, said face plate means including at least one face plate having at least one access opening formed therein to permit access to and operation of at least one of the machine control devices from the exterior of said case means, said face plate means further including means for variably selecting access to and operation of different selected ones of the machine control devices from the exterior of said case means.

17. The combination of claim 16 wherein said case means comprises a carrying case for substantially encasing the machine, and means for selectively locking said case against removal from the machine.

18. The combination of claim 17 wherein said carrying case is formed from a relatively lightweight plastic material having an impact resistant, double-walled construction.

19. The combination of claim 16 wherein said at least one face plate has a plurality of access openings formed therein to permit access therethrough to a limited plurality of the machine control devices.

20. The combination of claim 16 wherein said at least one face plate has a plurality of access openings formed therein, and including closure means associated with at least one selected access opening and movable between a first position permitting access through said selected opening and a second position preventing access through said selected opening.

21. The combination of claim 20 wherein said carrying case includes means for retaining said face plate and the machine in a position with said face plate closely overlying and substantially covering the plurality of machine control devices, and wherein said closure means comprises a panel member hingedly connected along one edge thereof to the side of said face plate adjacent the machine for swinging movement between the first and second positions, said panel member having a hinge radius size measured between said one edge and an opposite edge thereof substantially greater than the distance between said face plate and the machine control device to prevent movement between the first and second positions when said face plate is in the position substantially covering the machine control devices.

22. The combination of claim 16 wherein said face plates means includes a plurality of said face plates each having at least one access opening formed therein at a predetermined location to permit access to different combination of the machine control devices, each of said face plates being adapted for removable mounting with respect to the machine in a position substantially covering the machine control devices.

* * * * *